(12) United States Patent
Chang et al.

(10) Patent No.: US 7,720,851 B2
(45) Date of Patent: May 18, 2010

(54) ACTIVE CONTEXT-BASED CONCEPT FUSION

(75) Inventors: Shih-Fu Chang, New York, NY (US); Wei Jiang, New York, NY (US); Alexander C. Loui, Penfield, NY (US)

(73) Assignee: Eastman Kodak Company, Rochester, NY (US)

( * ) Notice: Subject to any disclaimer, the term of this patent is extended or adjusted under 35 U.S.C. 154(b) by 445 days.

(21) Appl. No.: 11/615,120

(22) Filed: Dec. 22, 2006

(65) Prior Publication Data

US 2007/0271256 A1 Nov. 22, 2007

Related U.S. Application Data

(60) Provisional application No. 60/800,761, filed on May 16, 2006.

(51) Int. Cl.
*G06F 17/30* (2006.01)

(52) U.S. Cl. ...................................................... 707/749

(58) Field of Classification Search .......... 707/1–104.1; 382/118, 128, 131, 190, 228, 294; 380/28; 345/424
See application file for complete search history.

(56) References Cited

U.S. PATENT DOCUMENTS

2006/0251292 A1* 11/2006 Gokturk et al. ............. 382/103
2007/0009160 A1* 1/2007 Loo et al. ................... 382/225
2007/0110322 A1* 5/2007 Yuille et al. ................. 382/227
2008/0055479 A1* 3/2008 Shehata et al. .............. 348/652
2009/0083010 A1* 3/2009 Qi et al. ......................... 703/2

OTHER PUBLICATIONS

M.R. Naphade, et al., "A factor graph framework for semantic video indexing", IEEE Trans on CSVT, (12)1: 40-52 2002.
SS. Pack and S.-F Chang, "Experiments in Constructing Belief Networks for Image Classification Systems", Proc. ICIP, Vancouver, Canada, Sep. 2000.
J. Smith et al., "Multimedia semantic indexing using model vectors", Proc. ICME, vol. 3, pp. 445-448, 2003.
A. Amir, et al., "IBM research TRECVID-2003 video retrieval system", Proc. NIST Text Retrieval Conf., (TREC), 2003.
M.E. Hellman; "Probability of Error, Equivocation, and the Chernoff Bound"; IEEE Trans. on Information Theory; vol. 16, No. 4, (1970); pp. 368-372.
N. Vasconcelos; "Feature Selection by Maximum Marginal Diversity:optimality and implications for visual recognition"; CVPR vol. 1 2003; pp. 762-769.

* cited by examiner

*Primary Examiner*—Diane Mizrahi
(74) *Attorney, Agent, or Firm*—Robert L. Walker; Justin D. Petruzzelli (57) ABSTRACT

A context-based concept fusion method detects a first concept in an image record. The method includes automatically determining at least one other concept in the image record which has a contextual relationship with the first concept and which is to be labeled by a user of the method; and labeling the at least one other concept by the user with a ground truth label to be used in the context-based concept fusion method to improve detection of the first concept in the image record.

15 Claims, 8 Drawing Sheets

TABLE 1. THE DATA SETS FOR EXPERIMENTS

| NAME | SIZE | USAGE |
|---|---|---|
| TRAINING SET | 41837 SUBSHOTS | TRAIN SVMs |
| VALIDATION SET | 4515 SUBSHOTS | LEARN RBF KERNEL FOR SVM |
| SELECTION SET 1 | 6021 SUBSHOTS | LEARN $\Theta, \eta, \Upsilon, \lambda_{\frac{1}{2}}$, IN EQ. (1,2) |
| SELECTION SET 2 | 3011 SUBSHOTS | LEARN $\beta$ IN EQ (4) |
| TEST SET | 6506 SUBSHOTS | PERFORMANCE EVALUATION |

ACTIVE CONTEXT-BASED CONCEPT FUSION

CROSS REFERENCE TO RELATED APPLICATIONS

This patent application claims priority of the filing date of commonly assigned, U.S. provisional patent application Ser. No. 60/800,761, entitled: ACTIVE CONTEXT-BASED CONCEPT FUSION WITH PARTIAL USER LABELS, filed May 16, 2006, in the names of Shih-Fu Chang, Wei Jiang, and Alexander C. Loui.

FIELD OF THE INVENTION

The invention in general relates to semantic concept detection in images and videos and more particularly relates to a new framework, called active context-based concept fusion, for effectively improving the accuracy of semantic concept detection in images and videos.

BACKGROUND OF THE INVENTION

Recognition of semantic information from visual context has been an important goal for research in image and video indexing. In recent years, NIST TRECVID (National Institute of Standards and Technology—Text Retrieval Conference—Video; see "Trec video retrieval evaluation", online at http://www-nlpir.nist.gov/projects/trecvid/) video retrieval evaluation has included a task in detecting high-level semantic features, such as locations, objects, people, and events from the image content of videos. Such high-level semantic features, termed "concepts" in this application, have been found to be very useful in improving quality of retrieval results in searching broadcast news videos.

A problem exists of enhancing concept detection accuracy. Semantic concepts usually do not occur in isolation—knowing the contextual information (e.g., outdoor) of an image is expected to help detection of other concepts (e.g., cars). For example, to detect "government leader" it is usually very hard to get a robust independent detector, because there are different persons from different views, and at different backgrounds. However, it is relatively easier to determine whether the image contains a face or whether it is an outdoor or indoor scene. These detection results form important context information which can be adopted to help detect "government leader" through a context-based model. Context-based concept fusion is such a framework to incorporate the interconceptual relationships to help detect individual concepts. It has a two-step framework. Given an input image, in the first step, independent detectors are applied to get an initial estimation about the posterior probabilities of concept labels. Then in the second step, these initial estimations are used as features to feed into a contex-based model which incorporates inter-conceptual relationships to refine the detection results.

Based on this idea, several Context-Based Concept Fusion (CBCF) methods have been proposed. The Multinet approach [M. R. Naphade, et al., "A factor graph framework for semantic video indexing", IEEE Trans on CSVT, (12)1: 40-52 2002] models the correlation between concepts with a factor graph and uses loopy probability propagation to modify the detection of each concept based on the detection confidence of other concepts. Because the joint probabilities of pairwise concepts are used as functions on the function nodes, thus needing a large amount of data to estimate, the performance will suffer when the training samples are limited. In [SS. Pack and S.-F Chang, "Experiments in Constructing Belief Networks for Image Classification Systems", Proc. ICIP, Vancouver, Canada, September 2000], models based on Bayesian Networks are used to capture the statistical interdependence among concepts present in consumer photographs. The Discriminative Model Fusion (DMF) method [J. Smith et al., "Multimedia semantic indexing using model vectors", Proc. ICME, vol. 3, pp. 445-448, 2003], generates a model vector based on the detection score of individual detectors, and a support vector machine (also referred to herein as an "SVM") is then trained to refine the detection of original concepts. In this method, there is needed an extra training set to train the context-based classifiers, and the performance will also suffer with limited training samples.

However, the results reported so far have indicated that not all concepts benefit from the CBCF strategy. As reported in A. Amir, et al., "IBM research TRECVID-2003 video retrieval system", Proc. NIST Text Retrieval Conf., (TREC), 2003, no more than 8 out of 17 concepts gain performance improvement by using CBCF. The lack of consistent performance gain could be attributed to several reasons: (1) insufficient data for learning reliable relations among concepts, (2) unreliable detectors, and (3) scales and complexity of the concept relations. Interestingly, results in Park and Chang, supra, suggests that user provided labels are much more effective in helping inferring other concepts compared to automatically detected labels.

It would thus be desirable to provide a method for effectively improving the accuracy of semantic concept detection in images and videos.

SUMMARY OF THE INVENTION

The invention is defined by the claims. The invention, in broader aspects, provides in a context-based concept fusion method for detecting a first concept in an image record, the improvement comprising: automatically determining at least one other concept in said image record which has a contextual relationship with said first concept and which is to be labeled by a user of said method; and labeling said at least one other concept by said user with a ground truth label to be used in said context-based concept fusion method to improve detection of said first concept in said image record.

It is an advantageous effect of the invention that an improved method is provided for accurately detecting semantic concepts in images and videos.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying figures wherein.

DETAILED DESCRIPTION OF THE INVENTION

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular and/or plural in referring to the "method" or "methods" and the like is not limiting.

The term "image record" is used here to refer to a digital still image, video sequence, or multimedia record. An image record is inclusive of one or more digital images and can also include metadata, such as sounds or textual annotations. A particular image record can be a single digital file or multiple, but associated digital files. Metadata can be stored in the same image file as the associated digital image or can be stored separately. Examples of image records include multiple spectrum images, scannerless range images, digital album pages, and multimedia video presentations. With a video sequence, the sequence of images is a single image record. Each of the images in a sequence can alternatively be treated as a separate image record. Discussion herein is generally directed to image records that are captured using a digital camera. Image records can also be captured using other capture devices and by using photographic film or other means and then digitizing.

In the following description, some features are described as "software" or "software programs". Those skilled in the art will recognize that the equivalent of such software can also be readily constructed in hardware. Because image manipulation algorithms and systems are well known, the present description emphasizes algorithms and features forming part of, or cooperating more directly with, the method. General features of the types of computerized systems discussed herein are well known, and the present description is generally limited to those aspects directly related to the method of the invention. Other aspects of such algorithms and apparatus, and hardware and/or software for producing and otherwise processing the image signals involved therewith, not specifically shown or described herein may be selected from such systems, algorithms, components, and elements known in the art. Given the description as set forth herein, all additional software/hardware implementation is conventional and within the ordinary skill in the art.

Figure 3:
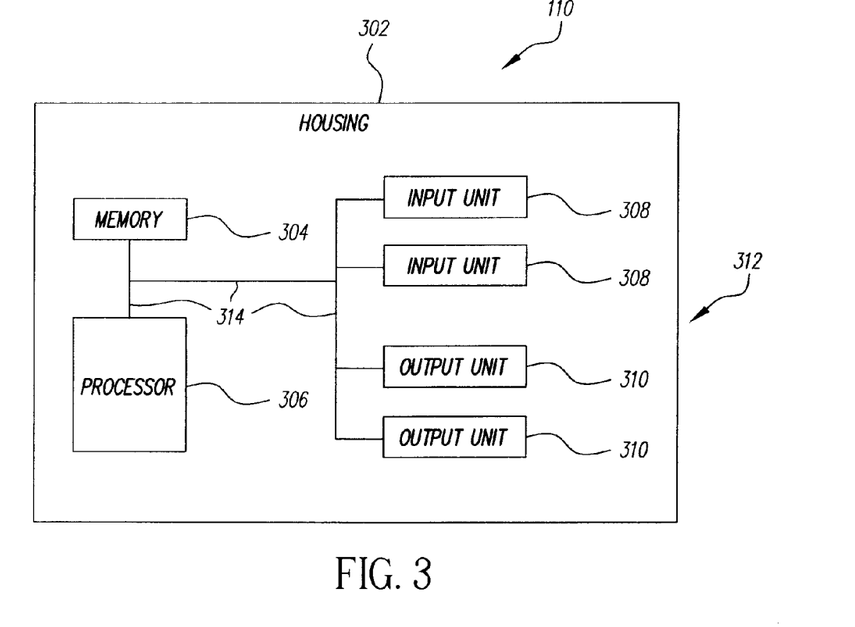
FIG. 3 is a diagrammatic view of an embodiment of the system.
Figure 4:
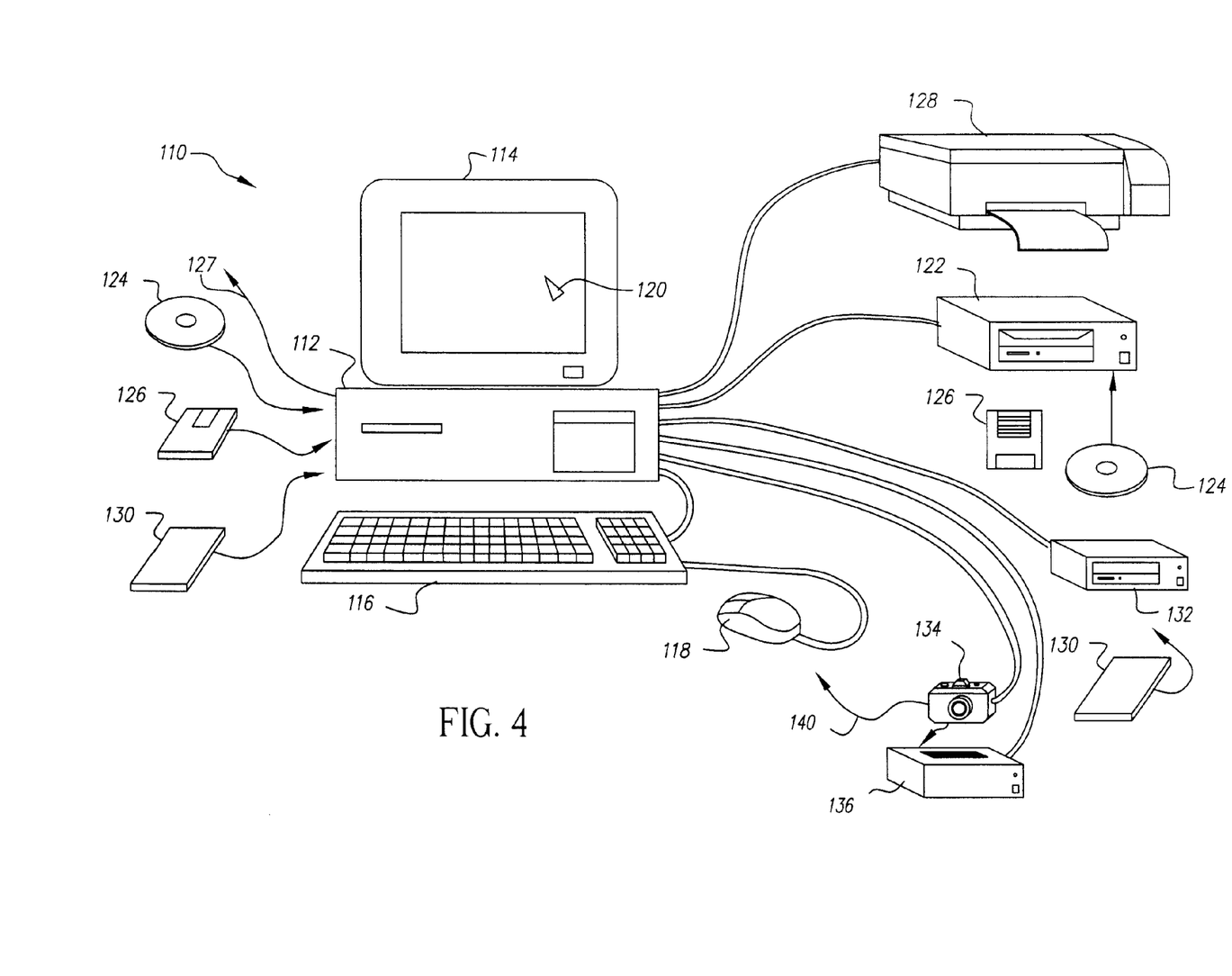
FIG. 4 is a diagrammatic view of another embodiment of the system.
Figure 5:
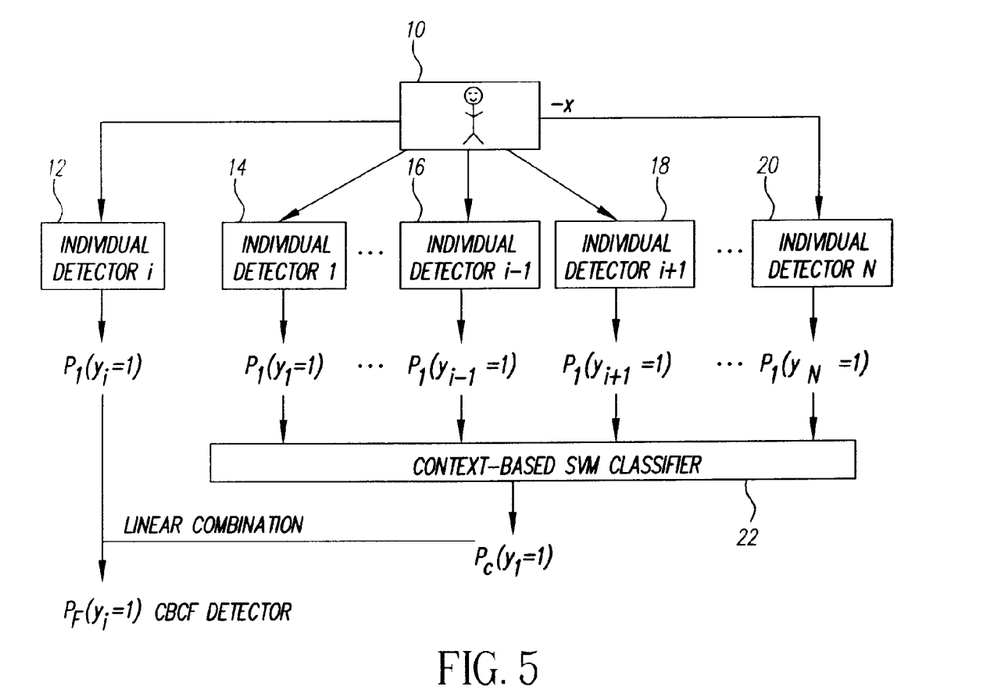
FIG. 5 is a block diagram for a context-based SVM for $S_i$.
Figure 6:
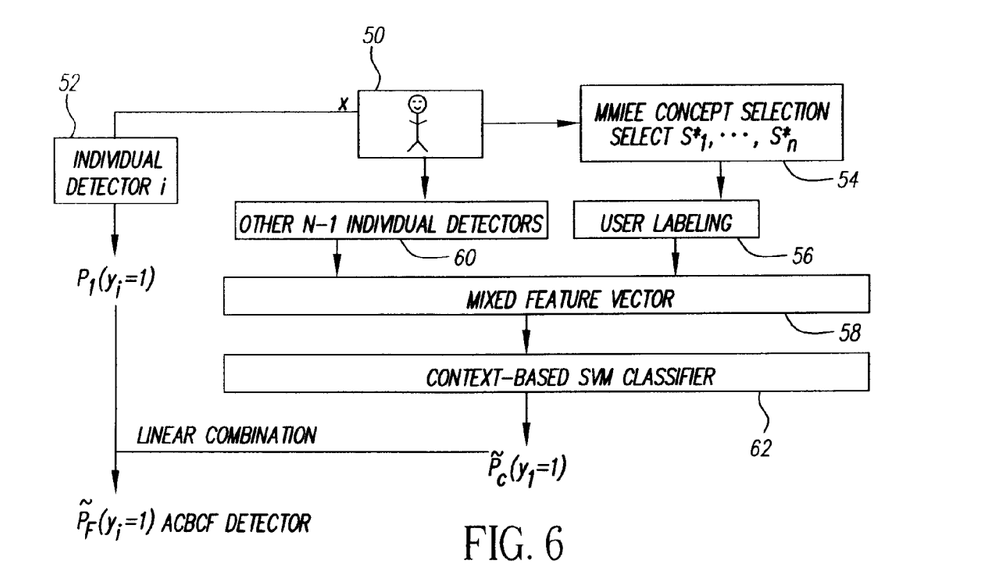
FIG. 6 is a block diagram of an ACBCF estimation for concept $S_i$.
Figure 7:
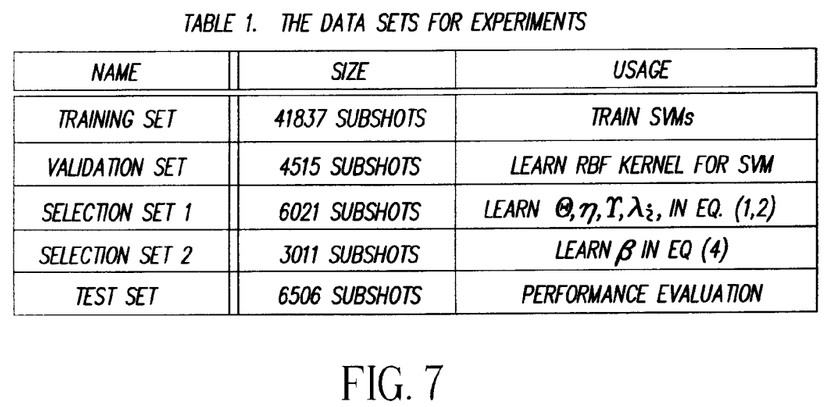
FIG. 7 is a Table showing the data sets for experiments.

FIG. 3 illustrates an embodiment of the system 110. The system 110 has a housing 302, memory 304 having a collection of image records, a processor 306, and input units 308 and output units 310 connected to the processor 306. The system 110 has a user interface (indicated by arrow 312) that includes some or all of the input and output units 308, 310. Components 302, 304, 306, 308, 310 are connected by signal paths 314 and, in this embodiment, the system components and signal paths are located within the housing 302 as illustrated. In other embodiments, one or more components and signal paths can be located in whole or in part outside of the housing. FIG. 4 illustrates another embodiment, in which the system 110 includes a general purpose computer and various peripherals. Different components of the system can be completely separate or can share one or more hardware and/or software features with other components.

The processor operates the other components of the system utilizing stored software and data based upon signals from the input units. The processor can include, but is not limited to, a programmable digital computer, a programmable microprocessor, a programmable logic processor, a series of electronic circuits, a series of electronic circuits reduced to the form of an integrated circuit, or a series of discrete components.

In addition to functions necessary to operate the system, the processor can manipulates image records according to software programs stored in memory either automatically or with user intervention. For example, a digital still image can be processed by the digital signal processor to provide interpolation and edge enhancement. Similarly, an image record may need to be transformed to accommodate different output capabilities, such as gray scale, color gamut, and white point of a display. The displayed image can may be cropped, reduced in resolution and/or contrast levels, or some other part of the information in the image may not be shown. Modifications related to file transfer, can include operations such as, JPEG compression and file formatting. Other enhancements can also be provided. The image modifications can also include the addition or modification of metadata, that is, image record associated non-image information.

"Memory" refers to one or more suitably sized logical units of physical memory provided in semiconductor memory or magnetic memory, or the like. Memory of the system can store a computer program product having a program stored in a computer readable storage medium. Memory can include conventional memory devices including solid state, magnetic, optical or other data storage devices and can be fixed within system or can be removable. For example, memory can be an internal memory, such as, such as SDRAM or Flash EPROM memory, or alternately a removable memory, or a combination of both. Removable memory can be of any type, such as a Compact Flash (CF) or Secure Digital (SD) type card inserted into a socket and connected to the processor via a memory interface. Other types of storage that are utilized include without limitation PC-Cards, MultiMedia Cards (MMC), or embedded and/or removable hard drives. In the embodiment of FIG. 4, system is shown having a hard drive, a disk drive for a removable disk such as an optical, magnetic or other disk memory (not shown) and a memory card slot that holds a removable memory, such as a removable memory card and has a removable memory interface for communicating with removable memory. Data including but not limited to control programs, digital images and other image records, and metadata can also be stored in a remote memory system such as a personal computer, computer network or other digital system.

The input units can comprise any form of transducer or other device capable of receiving an input from a user and converting this input into a form that can be used by the processor. Similarly, the output units can comprise any form of device capable of delivering an output in human perceptible form or in computer readable form as a signal or as part of a computer program product. Input and output units can be local or remote. A wired or wireless communications system that incorporates hardware and software of one or more input and output units can be included in the system.

The input units of the user interface can take a variety of forms. For example, the user interface can comprise a touch screen input, a touch pad input, a 4-way switch, a 6-way switch, an 8-way switch, a stylus system, a trackball system, a joystick system, a voice recognition system, a gesture recognition system a keyboard, a remote control or other such systems. In the embodiment shown in FIG. 1, the user interface includes an optional remote input, including a remote keyboard, a remote mouse, and a remote control; and a local input, including a local keyboard and a local mouse.

Input devices can include one or more sensors, which can include light sensors, biometric sensors and other sensors known in the art that can be used to detect conditions in the environment of system and to convert this information into a form that can be used by processor of the system. Light sensors can include one or more ordinary cameras and/or multispectral sensors. Sensors can also include audio sensors that are adapted to capture sounds. Sensors can also include biometric or other sensors for measuring involuntary physical and mental reactions such sensors including but not limited to voice inflection, body movement, eye movement, pupil dilation, body temperature, and the p4000 wave sensors.

Output units can also vary widely. In a particular embodiment, the system includes a display, a printer, and a memory writer as output units. The printer can record images on receiver medium using a variety of known technologies including, but not limited to, conventional four color offset separation printing or other contact printing, silk screening, dry electrophotography such as is used in the NexPress 2100 printer sold by Eastman Kodak Company, Rochester, N.Y., USA, thermal printing technology, drop on demand ink jet technology and continuous inkjet technology. For the purpose of the following discussions, the printer will be described as being of a type that generates color images on a paper receiver; however, it will be appreciated that this is not necessary and that the claimed methods and apparatuses herein can be practiced with a printer that prints monotone images such as black and white, grayscale or sepia toned images and with a printer that prints on other types of receivers.

A communication system can comprise for example, one or more optical, radio frequency or other transducer circuits or other systems that convert image and other data into a form that can be conveyed to a remote device such as remote memory system or remote display device using an optical signal, radio frequency signal or other form of signal. Communication system can also be used to receive a digital image and other data from a host or server computer or network (not shown), a remote memory system or a remote input. Communication system provides processor with information and instructions from signals received thereby. Typically, communication system will be adapted to communicate with the remote memory system by way a communication network such as a conventional telecommunication or data transfer network such as the internet, a cellular, peer-to-peer or other form of mobile telecommunication network, a local communication network such as wired or wireless local area network or any other conventional wired or wireless data transfer system.

A source of image records can be provided in the system. The source of image records can include any form of electronic or other circuit or system that can supply the appropriate digital data to the processor. The source of image records can be a camera or other capture device that can capture content data for use in image records and/or can obtain image records that have been prepared by or using other devices. For example, a source of image records can comprise a set of docking stations, intermittently linked external digital capture and/or display devices, a connection to a wired telecommunication system, a cellular phone and/or a wireless broadband transceiver providing wireless connection to a wireless telecommunication network. As other examples, a cable link provides a connection to a cable communication network and a dish satellite system provides a connection to a satellite communication system. An internet link provides a communication connection to a remote memory in a remote server. A disk player/writer provides access to content recorded on an optical disk.

The present invention can be implemented in computer hardware and computerized equipment. For example, the method can be performed using a system including one or more digital cameras or other capture devices and/or one or more personal computers. Referring to FIG. 4, there is illustrated a computer system 110 for implementing the present invention. Although the computer system 110 is shown for the purpose of illustrating a preferred embodiment, the present invention is not limited to the computer system 110 shown, but may be used with any electronic processing system such as found in digital cameras, cellular camera phones and other mobile devices, home computers, kiosks, retail or wholesale photofinishing, or any other system for the processing of digital images. The computer system 110 includes a processor 112 (also referred to herein as a digital image processor and illustrated in FIG. 4 as a personal computer) for receiving and processing software programs and for performing other processing functions. A display 114 is electrically connected to the processor 112 for displaying user-related information associated with the software, e.g., by means of a graphical user interface. A keyboard 116 is also connected to the processor 112 for permitting a user to input information to the software. As an alternative to using the keyboard 116 for input, a mouse 118 may be used for moving a selector 120 on the display 114 and for selecting an item on which the selector 120 overlays, as is well known in the art.

Removable memory, in any form, can be included and is illustrated as a compact disk-read only memory (CD-ROM) 124, which can include software programs, is inserted into the microprocessor based unit for providing a means of inputting the software programs and other information to the microprocessor based unit 112. Multiple types of removable memory can be provided (illustrated here by a floppy disk 126) and data can be written to any suitable type of removable memory. Memory can be external and accessible using a wired or wireless connection, either directly or via a local or large area network, such as the Internet. Still further, the processor 112 may be programmed, as is well known in the art, for storing the software program internally. A printer or other output device 128 can also be connected to the processor 112 for printing a hardcopy of the output from the computer system 110. The processor 112 can have a network connection 127, such as a telephone line or wireless link, to an external network, such as a local area network or the Internet.

Images may also be displayed on the display 114 via a memory card, such as a personal computer card (PC card) 130, such as, as it was formerly known, a PCMCIA card (based on the specifications of the Personal Computer Memory Card International Association), which contains digitized images electronically embodied in the card 130. The PC card 130 is ultimately inserted into the microprocessor based unit 112 for permitting visual display of the image on the display 114. Alternatively, the PC card 130 can be inserted into an externally located PC card reader 132 connected to the processor 112. Images may also be input via the compact disk 124, the floppy disk 126, or the network connection 127. Any images stored in the PC card 130, the floppy disk 126 or the compact disk 124, or input through the network connection 127, may have been obtained from a variety of sources, such as a digital camera or a scanner. Images may also be input directly from a digital camera 134 via a camera docking port 136 connected to the processor 112 or directly from the digital camera 134 via a cable connection 138 to the processor 112 or via a wireless connection 140 to the processor 112.

The output device 128 provides a final image(s) that has been subject to transformations. The output device can be a printer or other output device that provides a paper or other hard copy final image. The output device can also be an output device that provides the final image(s) as a digital file. The output device can also include combinations of output, such as a printed image and a digital file on a memory unit, such as a CD or DVD which can be used in conjunction with any variety of home and portable viewing device such as a "personal media player" or "flat screen TV".

The processor 112 provides means for processing the digital images to produce pleasing looking images on the intended output device or media. The present invention can be used with a variety of output devices that can include, but are not limited to, a digital photographic printer and soft copy display. The processor 112 can be used to process digital images to make adjustments for overall brightness, tone scale, image structure, etc. of digital images in a manner such that a pleasing looking image is produced by an image output device. Those skilled in the art will recognize that the present invention is not limited to just these mentioned image processing functions.

The method and apparatus herein can include features provided by software and/or hardware components that utilize various data detection and reduction techniques, such as face detection, skin detection, people detection, other object detection, for interpreting the scene depicted on an image, for example, a birthday cake for birthday party pictures, or characterizing the image, such as in the case of medical images capturing specific body parts.

It will be understood that the circuits shown and described can be modified in a variety of ways well known to those of skill in the art. It will also be understood that the various features described here in terms of physical circuits can be alternatively provided as firmware or software functions or a combination of the two. Likewise, components illustrated as separate units herein may be conveniently combined or shared. Multiple components can be provided in distributed locations.

A digital image includes one or more digital image channels or color components. Each digital image channel is a two-dimensional array of pixels. Each pixel value relates to the amount of light received by the imaging capture device corresponding to the physical region of pixel. For color imaging applications, a digital image will often consist of red, green, and blue digital image channels. Motion imaging applications can be thought of as a sequence of digital images. Those skilled in the art will recognize that the present invention can be applied to, but is not limited to, a digital image channel for any of the herein-mentioned applications. Although a digital image channel is described as a two dimensional array of pixel values arranged by rows and columns, those skilled in the art will recognize that the present invention can be applied to non-rectilinear arrays with equal effect.

It should also be noted that the present invention can be implemented in a combination of software and/or hardware and is not limited to devices, which are physically connected and/or located within the same physical location. One or more of the devices illustrated in FIGS. 3 and 4 can be located remotely and can be connected via a network. One or more of the devices can be connected wirelessly, such as by a radio-frequency link, either directly or via a network.

The present invention may be employed in a variety of user contexts and environments. Exemplary contexts and environments include, without limitation, wholesale imaging services, retail imaging services, use on desktop home and business computers, use on kiosks, use on mobile devices, and use as a service offered via a network, such as the Internet or a cellular communication network.

Portable display devices, such as DVD players, personal digital assistants (PDA's), cameras, and cell phones can have features necessary to practice the invention. Other features are well known to those of skill in the art. In the following, cameras are sometimes referred to as still cameras and video cameras. It will be understood that the respective terms are inclusive of both dedicated still and video cameras and of combination still/video cameras, as used for the respective still or video capture function. It will also be understood that the camera can include any of a wide variety of features not discussed in detail herein, such as, detachable and interchangeable lenses and multiple capture units. The camera can be portable or fixed in position and can provide one or more other functions related or unrelated to imaging. For example, the camera can be a cell phone camera or can provide communication functions in some other manner. Likewise, the system can take the form of a portable computer, an editing studio, a kiosk, or other non-portable apparatus.

In each context, the invention may stand alone or may be a component of a larger system solution. Furthermore, human interfaces, e.g., the scanning or input, the digital processing, the display to a user, the input of user requests or processing instructions (if needed), the output, can each be on the same or different devices and physical locations, and communication between the devices and locations can be via public or private network connections, or media based communication. Where consistent with the disclosure of the present invention, the method of the invention can be fully automatic, may have user input (be fully or partially manual), may have user or operator review to accept/reject the result, or may be assisted by metadata (metadata that may be user supplied, supplied by a measuring device (e.g. in a camera), or determined by an algorithm). Moreover, the algorithm(s) may interface with a variety of workflow user interface schemes.

In General

Referring to FIGS. 1-4, the invention provides a method and system method for detecting a first concept in an image record or collection of records. The image records can be collected in any manner. The size of the collection of image records is not critical, but larger collections can require longer processing times or increased computational resources. The collection can be defined physically or logically within memory of the system.

Figure 1:
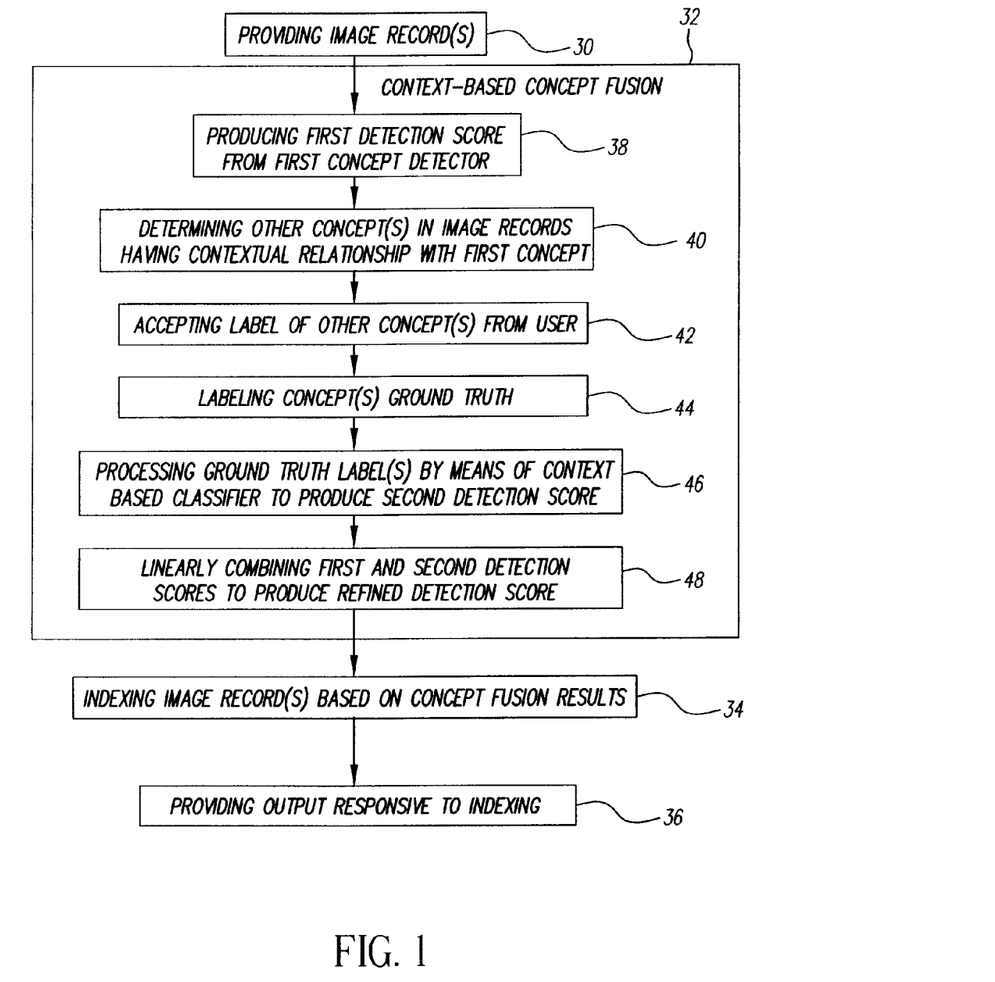
FIG. 1 is a flow chart of an embodiment of the method.

Referring to FIG. 1, in the method, image records are provided (30) and a context-based concept fusion (32) is performed. The concept fusion results are then used to index (34) the image record or records. An output can be provided (36) to the user responsive to the indexing (34). The context-based concept fusion of this embodiment, which is also referred to as "active CBCF" or active concept-based concept fusion", more effectively exploits contextual relations among concepts than a conventional context-based concept fusion.

In the Active CBCF, an individual detector dedicated to the function of detecting the first concept is used to produce (38) a first detection score relating to the presence of the first concept in the image record. (For convenience, the method and system are generally discussed herein relative to operation on a single image record.) Like considerations apply to operation of the same procedure on multiple records. The active context-based concept fusion then automatically determines (40) at least one other concept having a contextual relationship with the first concept.

The method continues with labeling by the user of the other concept with a ground truth label. In the labeling, the user is requested to indicate the presence of specified individual concepts in the image record. The label so provided by the user is accepted (42) and designated as a ground truth for the image record (44). The manner in which the user is queried and in which the user provides an indication of the label is not critical. It is convenient that the user be shown the image record and be asked by displayed text or the like, if the concept is present in the image record. The indication by the user can be through any input means, such as a keyboard or mouse. It is convenient, if the response by the user is a simple yes or no. After the concept has been labeled as ground truth for the image record, the label is processed (46) by means of a context based classifier to produce a second detection score. The first and second detection scores are linearly combined (48) to produce a refined detection score as the results of the concept fusion.

In indexing (34) the image record, the concept fusion results are used to categorize the image record. The manner in which this is done is not critical. For example, metadata can be associated with the image record that indicate the results of the concept fusion. The image record, similarly, can be grouped with other image records having like concept fusion results. Output, such as hard copy or soft copy display, can be provided responsive to the indexing. Output can be provided in any form. For example, particular image records can be retrieved and displayed following a search for particular concept fusion results.

In the Active CBCF, it is assumed that in many applications, users are willing to be involved and to annotate a few concepts in an image. The human annotated concepts are then used to help infer and improve detection of other concepts (up to hundreds). Although human assisted annotation is not new, conventional methods are disadvantageous in being passive and in asking users to annotate all concepts or a subset of arbitrarily chosen concepts. The question arises which concepts should a user be asked to annotate, if only a very small number of concepts, e.g., 1-3, are to be annotated. According to the invention, an active system is provided that adaptively selects the right "key" concepts, different for each image, for user annotation.

Based on the statistical principles, the method of the invention considers the mutual information between concepts, the estimated performance of individual concept detectors, and the confidence of detection for each concept for a given image. Experiments over TRECVID 2005 data (80 hours, 61000 subshots) show the active CBCF approach of the invention achieves significant performance gains—11.8% improvement in terms of mean average precision over individual concept detectors without CBCF.

In implementing a baseline CBCF system, there is also developed a simple but effective method to predict concepts that may benefit from the use of CBCF. This is motivated by the observation mentioned earlier that not all concepts benefit from context-driven statistical fusion—a prudent step in selecting application of the strategy is necessary. The following sections respectively describe: the baseline CBCF system and the prediction process; the core algorithm of the active CBCF system according to the invention; and experimental results from practicing the invention.

A Baseline CBCF Approach

Figure 9:
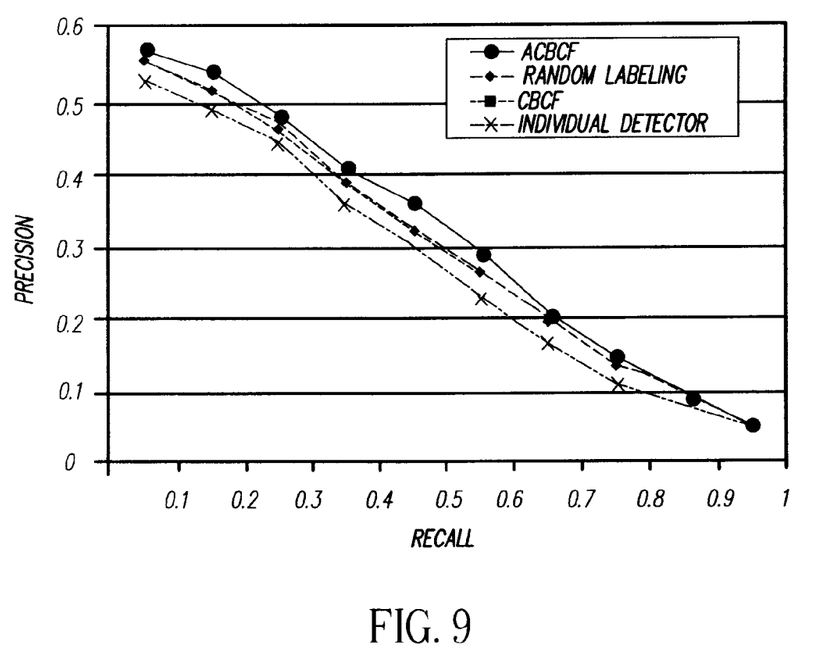
FIG. 9 is a graphical view showing the Precision-Recall curves when a user labels only one concept for each subshot.

This section introduces a baseline CBCF method followed by the criterion to determine which concepts to use CBCF learning. The scheme of the CBCF baseline method is shown in FIG. 9. Given an image x (box 10), for concept $S_i$, assume that the true label is $y_i$, where $y_i=1$ if x contains $S_i$, and $y_i=0$ otherwise. The individual detector I, whose function is to detect concept Si (box 12) produces a detection score $P_I(y_i=1)$. Individual detector 1 (box 14), . . . , individual detector i−1 (box 16), individual detector i+1 (box 18), . . . , and individual detector N (box 20), are also provided whose function is to detect other concepts from image x (box 10). A context based SVM is built to utilize the relationships among concepts to refine the detection result as follows. The concepts are treated as features of images, i.e., x is represented in an N-1 dim feature space as $[y_1, \ldots y_{i-1}, y_{i+1}, \ldots y_N]^T$. Based on this feature an SVM classifier (box 22) is trained. Then in the testing stage, for a test image, the estimated $[P_I(y_1=1), \ldots P_I(y_{i-1}=1), P_I(y_{i+1}=1), \ldots P_I(y_N=1)]^T$ is used to approximate the true labels (since the true labels are unknown for a test image) and is provided to the context-based SVM Classifier (box 22) to be classified. The classification result is $P_C(y_i=1)$, which is the prediction of existence of $S_i$ inferred from concepts other than $S_i$, based on the relationships among concepts and detection of other concepts. Finally, $P_C(y_i=1)$ and $P_I(y_i=1)$ are linearly combined into $P_F(y_i=1)$ as the refined detection result:

$$P_F(y_i=1)=\lambda_i P_C(y_i=1)+(1-\lambda_i)P_I(y_i=1) \quad (1)$$

The scheme described above is similar to the DMF scheme in J. Smith et al., referred to above, except there is used a linear fusion step at the end to combine the SVM fusion results with original detector output. In addition, in the training stage there is used ground truth labels, rather than the individual detector outputs (as in J. Smith et al., above), to train context-based SVMs. By this, there can be used the same data set to train the individual detectors and context-based SVMs, alleviating the problem of not having enough data for separate training and evaluation. Experiments have indicated such a training process is better than the alternative that uses detector outputs for training the context-based SVM.

Thus, for a particular concept, for example "government leader", it is known that the detection of face and outdoor form a context for detecting government leader. So in the context-based model, the initial estimation from all other concepts, like face and outdoor form a new feature vector and is fed into the context-based SVM classifier to get a posterior estimation of government-leader. This estimation is the prediction from all other concepts, which represents how other concepts think government-leader should be. And this estimation is linearly combined with the original estimation from the independent detector of government-leader itself to generate a final detection result.

As discussed above, not all concepts benefit from CBCF learning. Two reasons that can cause performance deterioration on a concept using CBCF: first, the concept has weak relationships with other concepts; second, the related concepts have poor individual detectors. This leads to the position that concept $S_i$ will use CBCF learning when (1) $S_j$ is strongly related to some other concepts, and the average performance of individual detectors of the related concepts are robust; and (2) the performance of its own individual detector is not perfect so that there is space for improvement.

Figure 2:
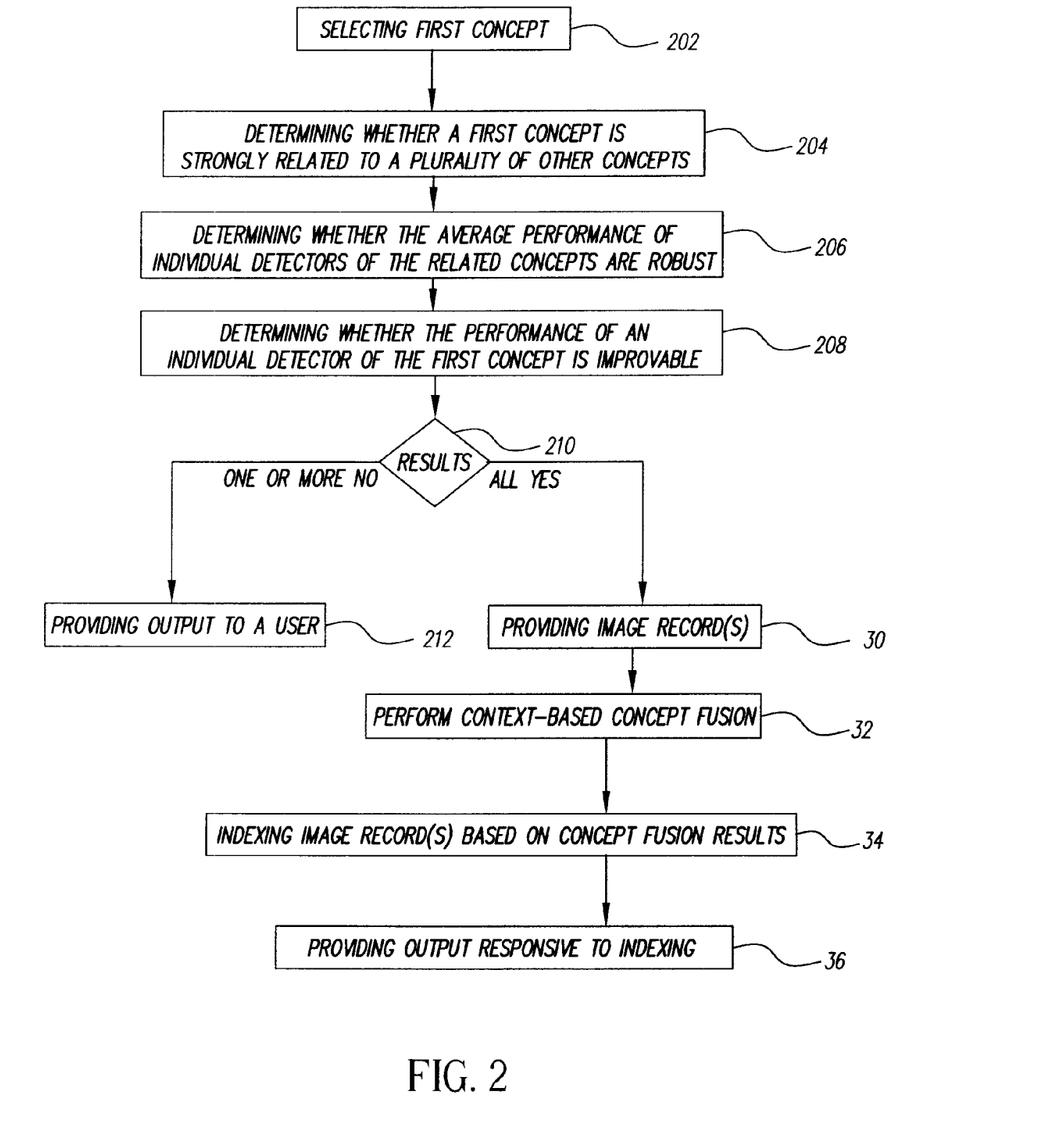
FIG. 2 is a flow chart of another embodiment of the method.

In a particular embodiment of the invention, the first concept to be used in the active context-based concept fusion, is determined based on these principles. Referring now to FIG. 2, a first concept is initially selected (202). The selection method is not critical and can be heuristically chosen. A determination (204) is next made as to whether the first concept is strongly related to a plurality of other concepts. A determination (206) is also made as to whether the average performance of individual detectors of the related concepts are robust. A third determination (208) is made as to whether the performance of an individual detector of the first concept can be improved. An evaluation (210) is made. If the answer to one or more of the above determinations (204), (206), (208) is no, then the first concept selected will not benefit from CBCF learning. An output can be provided (212) to the user at this point indicating that the first concept will not benefit and that another first concept should be selected to continue the method. If the answer to all of the determinations is yes, then the first concept can then be used in the embodiment of the method illustrated in FIG. 1.

Specifically, the relationship between two concepts $S_i$ and $S_j$ can be measured by their mutual information $I(S_i;S_j)$. By using a validation set, we get validation error rate $E_I(S_i)$ that estimates the robustness of individual detector for $S_i$. The criterion for applying the CBCF strategy to concept $S_i$ is:

$$E_I(S_i) > \theta \text{ and } \text{Avg}_{\{S_j: I(S_j; S_i) > \gamma\}} E_I(S_j) < \eta \qquad (2)$$

Note the first part favors concepts whose detection performance is "improvable", while the second part requires a concept has correlated concepts (in terms of mutual information) and they have adequate strength to help improve accuracy of the given concept. As will be described below, experimental results show this criterion is indeed effective, making 33 correct predictions for the 39 concepts from TRECVID 2005.

The Active CBCF Approach

In the active CBCF framework, user labeling is available. That is, the user answers one or a few simple yes/no questions, for example, whether there is a face in the image. Then the labeled ground truth is used instead of the posterior estimation from the independent detector, to feed into the context-based model to help final detection. Since ground truth labels are more accurate than probability estimation from independent detectors, better detection performance can be expected.

Figure 10:
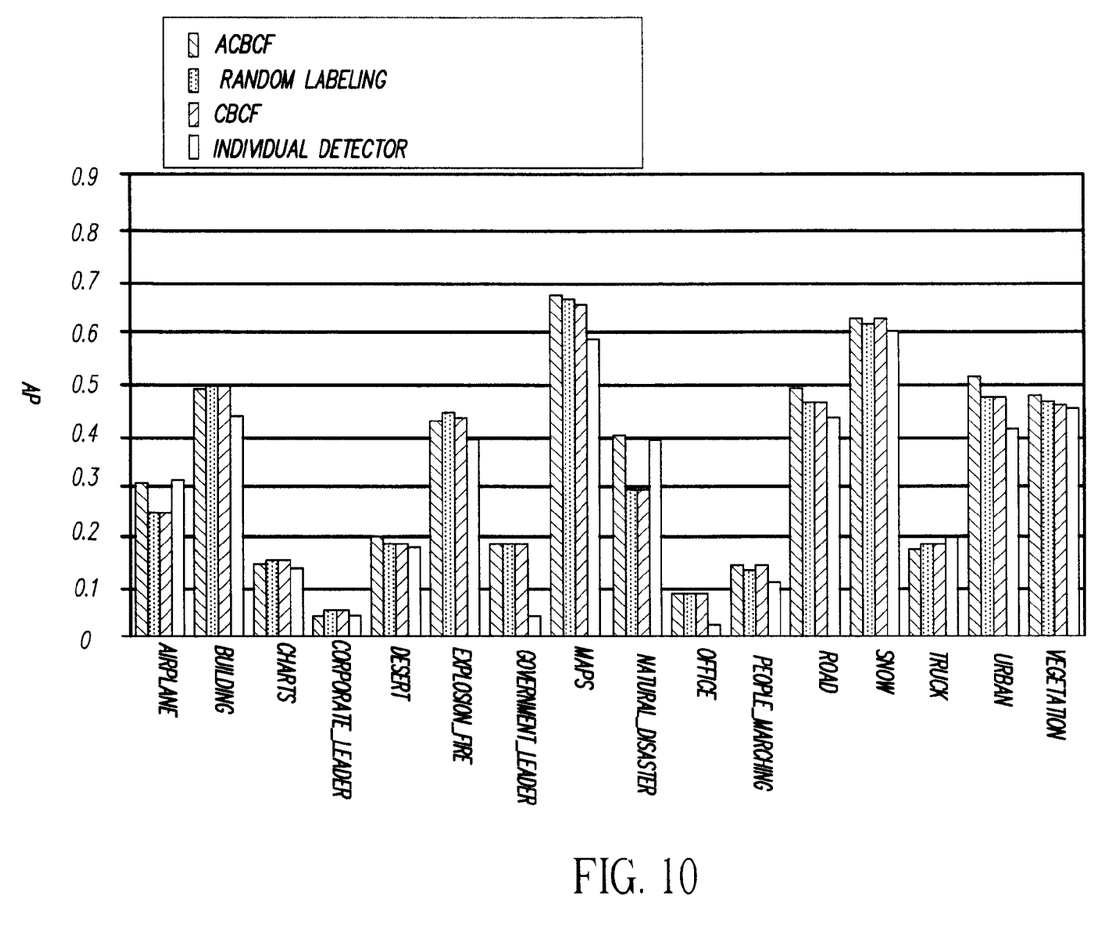
FIG. 10 is a bar graphical view showing the Average Precision (AP) for each of 16 selected concepts.

The active CBCF method (also referred to herein as "ACBCF") will now be described in greater detail. The work flow of the ACBCF method is illustrated in FIG. 10. In ACBCF, the user is willing to label a small number of concepts, and the labeled information is utilized to help detection of other concepts as follows. For a test image x (box 50) for a concept $S_i$, individual detector i (box 52) produces a detection score $P_I(y_i=1)$. MMIEE concept selection module (box 54) selects according to the invention a set of concepts $S^* = \{S^*_1, \ldots, S^*_n\}$ which the user labels (box 56). ("MMIEE" stands for: Maximizing Mutual Information between concepts and Incorporating Entropy and Error rate of individual detectors.) The labeled ground truth $y^*_1, \ldots, y^*_n$ are used to replace the corresponding hypotheses $P_I(y^*_1=1), \ldots, P_I(y^*_n=1)$ from individual detectors to generate a mixed feature vector. In the mixed feature vector (box 58), the entries corresponding to the labeled concepts are the labeled ground truth from user, and the other entries from "other N-1 Individual Detectors" (box 60) are still the estimated hypotheses from individual detectors. This mixed feature vector is provided to the context-based SVM classifier (box 62) to get a new classification result $\tilde{P}_F(y_C=1)$. Since the labeled ground truth provides accurate inputs instead of the inaccurate machine-predicted hypotheses, $\tilde{P}_I(y_C=1)$ is expected to be better than original $P_I(y_C=1)$ and the combined estimation (by using the ACBCF detector) $\tilde{P}_F(y_C=1)$ should outperform $P_F(y_C=1)$. Classifiers other than SVM can be used to generate this hypotheses estimations $P_C(y_i=1)$ and $P_I(y_i=1)$, including such classifiers as: linear discriminant analysis methods, flexible discriminants, (feed-forward) neural networks, non-parametric methods, tree-structured classifiers, and belief networks (such as Bayesian networks).

Different from passive labeling that randomly selects concepts, the ACBCF method of the invention, actively selects concepts for annotation. In following subsections are presented statistical criterion to select concepts based on mutual information between concepts, and the error rate and entropy of individual detection results.

The following is directed to maximizing mutual information. The average Bayes classification error for concept detection is $$\overline{\mathcal{E}} = \frac{1}{N} \sum_{i=1}^{N} \mathcal{E}(S_i)$$

where $E(S_i)$ is the error rate for concept $S_i$. The problem is to find an optimal $S^*$ with a small size n so that the labeled information can minimize $\overline{\mathcal{E}}$ of the rest of the concepts. Directly searching for $S^*$ to minimize $\overline{\mathcal{E}}$ is practically infeasible. Instead, minimization of the upper bound of $\overline{\mathcal{E}}$ is tried, which can be derived as in M. E. Hellman and J. Raviv, "Probability of error, equivocation, and the chernoff bound", *IEEE Trans. on Information Theory*, vol. 16, no. 4, (1970), pages 368-372:

$$\overline{\mathcal{E}} \leq \frac{1}{2N} \sum_i H(S_i) - \frac{1}{2N} \sum_i I(S_i; S^*_{1:n}),$$

where $$S^*_{1:n} = S^*_1, \ldots, S^*_n.$$

The classification error is upper bounded by this equation where H(S) is the entropy and I is the mutual information between concept I and the selected concepts.

Minimizing the upper bound equals maximizing mutual information $$\sum_i I(S_i; S^*_{1:n}) \cdot I(S_i; S^*_{1:n})$$

can be written as presented in N. Vasconcelos, "Feature selection by maximum marginal diversity: optimality and implications for visual recognition", *Proc. CVPR*, vol. 1, (2003), pages 762-769:

$$I(S_i; S^*_{1:n}) = \sum_{k=1}^{n} I(S_i; S^*_k) - \sum_{k=2}^{n} [I(S^*_k; S^*_{1:k-1}) - I(S^*_k; S^*_{1:k-1}|S_i)]$$

The above expression can be further simplified as follows:

$$I(S^*_k; S^*_{1:k-1}) - I(S^*_k; S^*_{1:k-1} | S_i) = H(S_i) + H(S^*_k)$$

So maximizing $$\sum_i I(S_i; S^*_{1:n})$$

equals maximizing;

$$\sum_i \sum_{k=1}^n I(S_i; S^*_k) - \sum_i \sum_{k=2}^n H(S^*_k) \quad (3)$$

With the objective function of Eq. (3), we can implement a sequential concept selection process as follows:
1. Select the 1$^{st}$ optimal $S^*_1$ with largest $$g^*_1 = \sum_i I(S_i; S^*_1)$$

2. Select the kth optimal $S^*_k$, k>1 with largest $$g^*_k = \sum_i [I(S_i; S^*_k) - H(S^*_k)] = \sum_i H(S^*_k | S_i)$$

g is defined in the sequential concept selection process:

$$g^*_1 = \Sigma_i I(S_i; S^*_1) \quad 1.$$

$$g^*_k = \Sigma_i [I(S_i; S^*_k) - H(S^*_k)] = -\Sigma_i H(S^*_k | S_i), k>1 \quad 2.$$

The best concept has the highest total mutual information with the rest of the concepts, and the successive optimal concepts are those having the largest mutual information with all of the remaining concepts and also have low conditional entropy, (i.e., high correlations with the rest of concepts). That is, different users tend to give the same label for this concept.

When $g^*_k$ is large, accurate labels for $S^*_k$ are desired to better estimate the rest of the concepts. If $S^*_k$ can be classified accurately by the individual detector, that is, if the user's labeling will not make a big difference, then it will be more beneficial to ask the user to label a different concept that has low detection accuracy. Thus, there is a need to take into consideration the robustness of the individual detectors. Furthermore, for a test image, if an individual detector has a very high confidence on its hypothesis, it can be assumed that the estimated label of this detector is close to the true label. Then the user's labeling will not make a big difference either and those informative concepts of individual detectors having estimates with lower confidence levels should get higher priorities for user annotation.

From validation, the validation error rate $E_f(S_i)$ of the individual detector for every concept $S_i$, which estimates the average robustness of the individual detector, is obtained. The confidence of an individual detector about its hypothesis can be measured by the entropy of its output:

$$H_f(S_i | x) = -P_f(y_i=1) \log P_f(y_i=1) - P_f(y_i=0) \log P_f(y_i=0).$$

This measure is computed for each image and, thus, is image dependent. Let $\tilde{g}^*_k$ be the normalized version of $g^*_k$ (normalized to[0,1]). To take into consideration the mutual information among concepts as well as the robustness and confidence of individual detectors, the criterion of the invention selects "key" concepts as follows: the optimal $S^*_k$ are those having the largest $G^*_k$, where $$G^*_k = \beta \tilde{g}^*_k + (1-\beta) E_f(S^*_k) H_f(S^*_k | x) \quad (4)$$

G is the informative degree value from the sequential concept selection process. The inclusion of the last term in equation (4) makes the selection criterion image-dependent. Thus, different questions to select the different appropriate concepts for the user to label, are asked for different images.

Experimental Results

Figure 11:
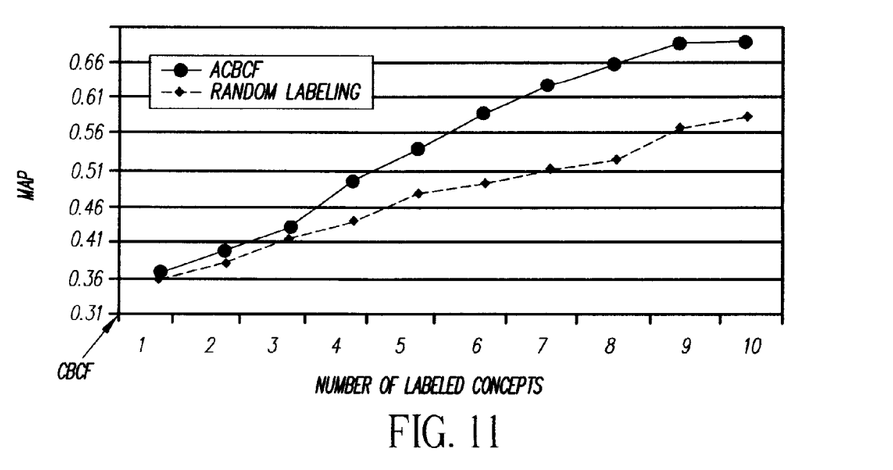
FIG. 11 is a graphical view of the Mean Average Precision (MAP) with different numbers of labeled concepts.

The data set contains 137 international broadcast news videos from TRECVID 2005 and contains 39 concepts. It is separated into four data sets for training detectors, different stages of fusion methods, and final testing (shown in FIG. 11). The dataset is divided into 5 subsets as follows:
(1). The largest set is the training set used for training both independent and context-based SVM classifiers;
(2) A validation set is used to learn the parameters for RBF (radial basis function) kernels in SVM;
(3) Selection set 1 is used to learn the parameters for predicting which concept will benefit from CBCF;
(4) Selection set 2 is used to learn the parameters for selecting the best concepts for the user to label: and
(5) The test set is used for performance evaluation The pair-wise co-occurrence of concepts in subshots are counted based on the training set, validation set, selection set 1 and selection set 2, based on which the mutual information in Eq. (2) is calculated. Our individual concept detectors are SVM-based classifiers over simple image features such as grid color features and texture extracted from key frames of a video subshot. Such classifiers have been shown to be effective for detecting generic concepts in the A. Amir et al. reference cited above. The outputs of the SVM classifiers are transformed into probabilities through a sigmoid function.

Evaluation of Baseline CBCF

Figure 8:
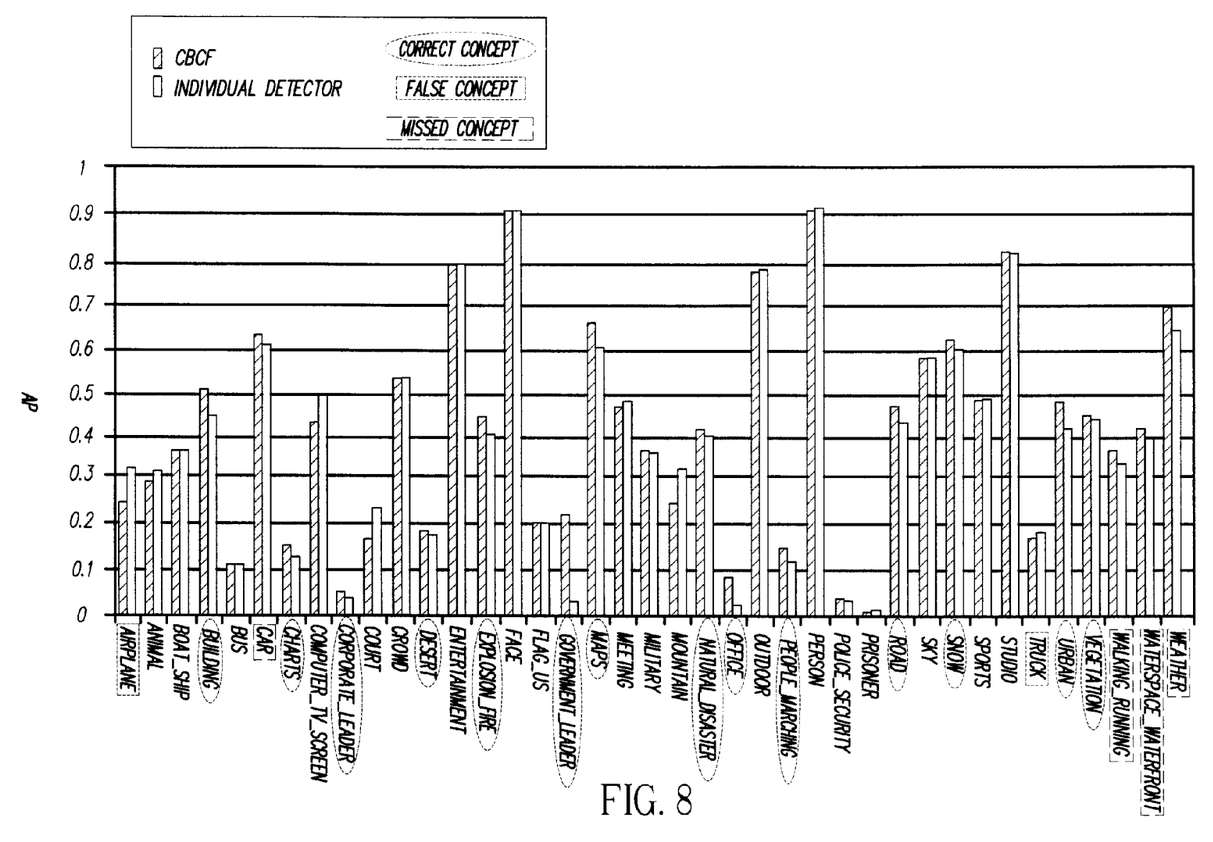
FIG. 8 is a bar graphical view showing the performance of the approach of FIG. 1 on 39 concepts.

In this experiment, there was evaluated the baseline CBCF approach in FIG. 9 and the criterion given above to select concepts for updating. After validation and the selected process 1, 16 concepts are predicted to benefit from the use of CBCF. These concepts are: airplane, building, charts, corporate-leader, desert, explosion-fire, government-leader, map, natural-disaster, office, people-marching, road, snow, truck, urban, and vegetation. FIG. 8 shows the Average Precision (AP) for the 39 concepts of the baseline CBCF and the individual detectors on the test set. AP is the official TRECVID performance metric. It is related to the multi-point average precision value of a precision-recall curve. From FIG. 8 it can be seen that CBCF actually improves the detection of 18 concepts, and 14 of them are automatically picked up by the criterion discussed in the Baseline CBCF Approach section above. Among the 16 selected concepts 2 do not have performance improvements. That is, the precision of the prediction method is 14/16 and the recall is 14/18. It is interesting to note that "government leader" and "office" are two concepts that benefit most from CBCF. Furthermore, most of the concepts not selected are rejected by η and γ in Eq. (2), which indicates that the context relation and the robustness of related context is important to qualify a concept for benefiting from CBCF.

Evaluation of the ACBCF Approach

To show the effectiveness of the ACBCF method, it is compared with three other methods: the passive labeling (randomly select concepts for user to label), the baseline CBCF without active labeling, and the individual detector without concept fusion. Note that with user interaction, some subshots are labeled for each concept. If there is calculated precision or recall based on all the test subshots, the comparison will be unfair to the algorithms without user labeling. To avoid this problem, the algorithms are compared as follows: for each concept Si, those subshots selected to be labeled by either the ACBCF method of the invention or random labeling are taken out, and the rest of subshots are included for calculating precision or recall.

FIG. 9 shows the Precision-Recall curves (the precision is averaged on the selected 16 concepts) when the user labels only one concept for each subshot. FIG. 10 gives the corresponding AP on each of the selected 16 concepts. FIG. 10 shows that out of the selected 16 concepts, 14 have obvious performance improvements using the ACBCF method of the invention. Furthermore, the improvements for most concepts are significant, e.g., 650% for government-leader, 14% for map, 357% for office, 34% for people marching, 13% for road, and 25% for urban. The Mean AP (MAP) of ACBCF on the entire 16 concepts is 0.322, which outperforms random labeling by 4.1%, outperforms baseline CBCF by 3.1%, and outperforms the individual detector by 11.8%. Moreover, the ACBCF method of the invention yields more stable results than both random labeling and CBCF. For example, as reported above, on two of the selected concepts (airplane and truck) the CBCF performance actually deteriorates. The deterioration is especially severe for airplane. On the contrary, the ACBCF method of the invention remains more effective consistently across all selected concepts.

In addition, there was evaluated the performance when different numbers of concepts are labeled by the user for each subshot. The MAPs on the selected 16 concepts are given in FIG. 11, which shows that compared with random labeling, when more concepts are labeled, the advantage of the ACBCF method is even more significant. Also, on test set, when 1 concept is labeled for each subshot, outdoor is selected to be labeled for 70% of subshots. When 2 concepts are labeled, besides outdoor, airplane is the second most popular concept selected for 43% of subshots. When 3 concepts are labeled, besides outdoor and airplane, court is selected 36% of subshots as the third most popular concept.

According to the invention, there is provided a new statistical framework, active context-based concept fusion, for improving the performance of detecting semantic concepts in images and videos. The framework incorporates user's interaction to annotate a small number of key concepts per image, which are then used to improve detection of other concepts. In addition, the invention provides a simple yet accurate method in predicting concepts that may benefit from context-based fusion. Experiments over TRECVID05 data have confirmed the effectiveness of the inventive paradigm.

The invention has been described in detail with particular reference to certain preferred embodiments thereof, but it will be understood that variations and modifications can be effected within the spirit and scope of the invention.

The invention claimed is:

1. A method implemented by a computer system, the method for detecting a first concept in an image record, and the method comprising:

performing a context-based concept fusion, said performing including the steps of:

automatically determining, using a computer system, at least one other concept in said image record which has a contextual relationship with said first concept, by automatically determining a subset of concepts to be labeled by a user from a larger set of concepts according to the following selection criteria:

(a) a best concept to be labeled from a plurality of concepts has a highest mutual information with the other concepts from the plurality of concepts; and (b) successive optimal concepts to be labeled are those having the largest mutual information with remaining concepts from the plurality of concepts and low conditional entropy relative to the other concepts from the plurality of concepts, accepting a label of said at least one other concept from a user via an input device;

detecting said first concept in said image record at least by utilizing said label; and storing information pertaining to the detecting of said first concept in a computer-readable memory.

2. The method of claim 1 wherein said automatically determining includes minimizing an average Bayes classification error for concept detection.

3. The method of claim 2 wherein said minimizing includes maximizing mutual information between concepts.

4. The method of claim 1 further comprising:

indexing said image record based on said concept fusion; and providing an output responsive to said indexing.

5. A method implemented by a computer system, the method for detecting at least a first concept in an image record, and the method comprising:

producing a first detection score relating to said first concept based upon a detection performed by an individual detector that detected said first concept;

automatically determining, using a computer system, at least one other concept in said image record which has a contextual relationship with said first concept and which is to be labeled by a user by automatically determining a subset of concepts to be labeled by a user from a larger set of concepts according to the following selection criteria:

(a) a best concept to be labeled from a plurality of concepts has a highest mutual information with the other concepts from the plurality of concepts; and (b) successive optimal concepts to be labeled are those having the largest mutual information with remaining concepts from the plurality of concepts and low conditional entropy relative to the other concepts from the plurality of concepts;

accepting a label of said at least one other concept from the user via an input device;

producing a second detection score at least by processing the label using a context-based classifier;

linearly combining said first and second detection scores to produce a refined detection score relating to said first concept in said image record; and storing information pertaining to the refined detection score in a computer-readable memory.

6. The method of claim 5 further comprising:

producing another detection score relating to another concept which has a contextual relationship with said first concept based upon a detection performed by an individual detector that detected said another concept; and producing a mixed feature vector from said another detection score and said label, wherein said second detection score is produced at least by processing the mixed feature vector using a context-based classifier.

7. The method of claim 5 wherein said automatically determining includes minimizing an average Bayes classification error for concept detection.

8. The method of claim 5 wherein said minimizing includes maximizing mutual information between concepts.

9. The method of claim 5 further comprising:
indexing said image record based on said refined detection score; and providing an output responsive to said indexing.

10. A method implemented by a computer system, the method for detecting at least a first concept in an image record, and the method comprising:
producing a first detection score relating to said first concept based upon a detection performed by an individual detector that detected said first concept;
automatically determining, using a computer system, a plurality of other concepts in said image record which have a contextual relationship with said first concept and which are to be labeled by a user by automatically determining a subset of concepts to be labeled by a user from a larger set of concepts according to the following selection criteria:
(a) a best concept to be labeled from a particular plurality of concepts has a highest mutual information with the other concepts from the particular plurality of concepts; and
(b) successive optimal concepts to be labeled are those having the largest mutual information with remaining concepts from the particular plurality of concepts and low conditional entropy relative to the other concepts from the plurality of concepts;
accepting a label for each of said plurality of other concepts from the user via an input device;
producing a second detection score at least by processing the labels using a context-based classifier;
linearly combining said first and second detection scores to produce a refined detection score relating to said first concept in said image record; and
storing information pertaining to the refined detection score in a computer-readable memory.

11. The method of claim 10 further comprising:
producing a plurality of detection scores relating to a plurality of still other concepts which have a contextual relationship with said first concept based upon a detection performed by individual detectors that respectively detected said plurality of still other concepts; and
producing a mixed feature vector from said plurality of detection scores and said labels,
wherein said second detection score is produced at least by processing the mixed feature vector using a context-based classifier.

12. The method of claim 10 wherein said automatically determining includes minimizing an average Bayes classification error for concept detection.

13. The method of claim 10 wherein said minimizing includes maximizing mutual information between concepts.

14. The method of claim 10 further comprising:
indexing said image record based on said refined detection score; and
providing an output responsive to said indexing.

15. A computer-readable memory storing a program that when executed by a computer causes the computer to perform a method for detecting a first concept in an image record, the method comprising:
producing a first detection score relating to said first concept based upon a detection performed by an individual detector that detected said first concept;
automatically determining at least one other concept in said image record which has a contextual relationship with said first concept and which is to be labeled by a user by automatically determining a subset of concepts to be labeled by a user from a larger set of concepts according to the following selection criteria:
(a) a best concept to be labeled from a plurality of concepts has a highest mutual information with the other concepts from the plurality of concepts; and
(b) successive optimal concepts to be labeled are those having the largest mutual information with remaining concepts from the plurality of concepts and low conditional entropy relative to the other concepts from the plurality of concepts,
accepting a label of said at least one other concept from the user via an input device;
producing a second detection score at least by processing the label using a context-based classifier;
linearly combining said first and second detection scores to produce a refined detection score relating to said first concept in said image record; and
storing information pertaining to the refined detection score in a computer-readable memory.

* * * * *